(12) United States Patent
Shinohara et al.

(10) Patent No.: US 11,143,242 B2
(45) Date of Patent: Oct. 12, 2021

(54) JOURNAL DEVICE AND ROTARY MACHINE

(71) Applicant: Mitsubishi Hitachi Power Systems, Ltd., Yokohama (JP)

(72) Inventors: Tanehiro Shinohara, Tokyo (JP); Takaaki Kaikogi, Tokyo (JP); Takashi Nakano, Yokohama (JP); Yuichiro Waki, Yokohama (JP); Yutaka Ozawa, Takasago (JP); Naoto Tochitani, Yokohama (JP)

(73) Assignee: MITSUBISHI POWER, LTD., Yokohama (JP)

( * ) Notice: Subject to any disclaimer, the term of this patent is extended or adjusted under 35 U.S.C. 154(b) by 0 days.

(21) Appl. No.: 16/073,088

(22) PCT Filed: Feb. 28, 2017

(86) PCT No.: PCT/JP2017/007679
§ 371 (c)(1),
(2) Date: Jul. 26, 2018

(87) PCT Pub. No.: WO2017/150501
PCT Pub. Date: Sep. 8, 2017

(65) Prior Publication Data
US 2019/0032718 A1 Jan. 31, 2019

(30) Foreign Application Priority Data
Feb. 29, 2016 (JP) .............................. JP2016-036929

(51) Int. Cl.
*F16C 33/74* (2006.01)
*F16C 17/02* (2006.01)
(Continued)

(52) U.S. Cl.
CPC ............ *F16C 33/748* (2013.01); *F01D 25/16* (2013.01); *F01D 25/166* (2013.01); *F01D 25/18* (2013.01);
(Continued)

(58) Field of Classification Search
CPC .......... F16C 17/02; F16C 17/03; F16C 33/10; F16C 33/1045; F16C 33/748;
(Continued)

(56) References Cited

U.S. PATENT DOCUMENTS 4,097,094 A * 6/1978 Gardner .................. F16C 17/02
384/215
4,294,494 A * 10/1981 Yoshioka ............ F16C 33/1065
384/313
(Continued)

FOREIGN PATENT DOCUMENTS

CN 101981333 A 2/2011
CN 103534460 A 1/2014
(Continued)

OTHER PUBLICATIONS

International Search Report dated May 30, 2017, issued in counterpart International Application No. PCT/JP2017/007679. (12 pages).
(Continued)

*Primary Examiner* — Marcus Charles
(74) *Attorney, Agent, or Firm* — Westerman, Hattori, Daniels & Adrian, LLP

(57) ABSTRACT

A journal bearing includes: a carrier ring; a plurality of bearing pads disposed on a radially inner side of a lower half region of the carrier ring, and configured to support a rotor shaft from below; and a guide metal disposed in an upper half region of the carrier ring, in center with respect to an axial direction of the rotor shaft, so as to cover an upper region of an outer peripheral surface of the rotor shaft.

10 Claims, 4 Drawing Sheets

(51) Int. Cl.
| | |
|---|---|
| *F16C 33/10* | (2006.01) |
| *F01D 25/16* | (2006.01) |
| *F01D 25/18* | (2006.01) |
| *F02C 7/06* | (2006.01) |
| *F16C 17/03* | (2006.01) |

(52) U.S. Cl.
 CPC ............. *F01D 25/186* (2013.01); *F02C 7/06* (2013.01); *F16C 17/02* (2013.01); *F16C 17/03* (2013.01); *F16C 33/10* (2013.01); *F16C 33/1045* (2013.01); *F16C 33/1085* (2013.01); *F05D 2220/31* (2013.01); *F05D 2220/32* (2013.01); *F05D 2240/54* (2013.01); *F05D 2240/55* (2013.01); *F05D 2260/98* (2013.01); *F16C 2360/00* (2013.01)

(58) Field of Classification Search
 CPC .............. F16C 33/1025; F16C 33/1085; F16C 32/0685; F16C 2360/00; F01D 25/16; F01D 25/166; F01D 25/18; F01D 25/186; F02C 7/06; F05D 2220/31; F05D 2220/32; F05D 2240/54; F05D 2240/55; F05D 2260/98
 USPC ....... 384/122, 134, 312, 313, 321, 385, 397, 384/401, 456, 372
 See application file for complete search history.

(56) References Cited

U.S. PATENT DOCUMENTS

| | | | | |
|---|---|---|---|---|
| 4,300,808 | A * | 11/1981 | Yoshioka ................ | F16C 17/03 384/312 |
| 5,738,447 | A * | 4/1998 | Nicholas ................ | F16C 17/03 384/117 |
| 5,743,657 | A * | 4/1998 | O'Reilly ................ | F16C 17/03 384/312 |
| 7,780,424 | B2 * | 8/2010 | Parmeter ................ | F16C 17/03 384/12 |
| 8,123,409 | B2 * | 2/2012 | Waki ................ | F16C 17/03 384/122 |
| 8,366,323 | B2 * | 2/2013 | Waki ................ | F16C 17/03 384/117 |
| 9,416,820 | B2 * | 8/2016 | Ertas ................ | F16C 32/0662 |
| 9,429,191 | B2 * | 8/2016 | Ertas ................ | F01D 25/164 |
| 9,534,637 | B2 * | 1/2017 | Livermore-Hardy ................ F16C 37/002 | |
| 9,618,048 | B2 * | 4/2017 | Nicholas ................ | F16C 37/002 |
| 9,765,817 | B1 * | 9/2017 | Chen ................ | F16C 33/1045 |
| 10,145,378 | B2 * | 12/2018 | Miyata ................ | F04D 29/284 |
| 2010/0142870 | A1 * | 6/2010 | Waki ................ | F16C 23/04 384/192 |
| 2010/0177999 | A1 * | 7/2010 | Waki ................ | F16C 23/02 384/312 |
| 2010/0220944 | A1 | 9/2010 | Waki et al. | |
| 2013/0223775 | A1 | 8/2013 | Suzuki et al. | |
| 2013/0330030 | A1 * | 12/2013 | Suzuki ................ | F16C 17/03 384/322 |
| 2014/0112776 | A1 | 4/2014 | Kamata | |
| 2014/0270607 | A1 * | 9/2014 | Livermore-Hardy ................ F16C 33/108 384/117 | |
| 2015/0003762 | A1 | 1/2015 | Sato et al. | |
| 2015/0104123 | A1 | 4/2015 | Ertas et al. | |
| 2016/0053687 | A1 | 2/2016 | Tsutsumi et al. | |
| 2016/0123332 | A1 | 5/2016 | Miyata et al. | |
| 2017/0260874 | A1 * | 9/2017 | Yoshimine .............. | F16C 33/10 |
| 2019/0128321 | A1 * | 5/2019 | Nakano .................. | F16C 17/03 |

FOREIGN PATENT DOCUMENTS

| | | |
|---|---|---|
| CN | 104251264 A | 12/2014 |
| CN | 105339688 A | 2/2016 |
| EP | 2402621 A1 | 1/2012 |
| JP | 63-132114 U | 8/1988 |
| JP | 5-332355 A | 12/1993 |
| JP | 2003-176818 A | 6/2003 |
| JP | 2006-234147 A | 9/2006 |
| JP | 2010-203481 A | 9/2010 |
| JP | 2011-179609 A | 9/2011 |
| JP | 4764486 B2 | 9/2011 |
| JP | 2013-177942 A | 9/2013 |
| JP | 5370215 B2 | 12/2013 |
| JP | 2014-196788 A | 10/2014 |
| JP | 2015-007463 A | 1/2015 |
| JP | 2015-31372 A | 2/2015 |
| JP | 2016-142312 A | 8/2016 |
| KR | 10-1088271 B1 | 11/2011 |
| WO | 2010/055847 A1 | 5/2010 |
| WO | 2015/033438 A1 | 3/2015 |
| WO | WO-2015033438 A1 * | 3/2015 ........... F04D 29/059 |

OTHER PUBLICATIONS

Notification of Transmittal of Translation of the International Preliminary Report on Patentability (Form PCT/IB/338) issued in counterpart International Application No. PCT/JP2017/007679 dated Sep. 13, 2018, with Forms PCT/IB/373, PCT/IB/326 and PCT/ISA/237, with English translation. (21 pages).
Office Action dated May 29, 2019, issued in counterpart CN Application No. 201780012915.6, with English translation (15 pages).
Office Action dated Sep. 6, 2019, issued in counterpart KR application No. 10-2018-7024042, with English translation. (16 pages).
Office Action dated Oct. 1, 2019, issued in counterpart JP application No. 2016-036929, with English translation. (8 pages).
Office Action dated Jan. 20, 2020, issued in counterpart KR Application No. 10-2018-7024042, with English translation (15 pages).
Office Action dated Oct. 13, 2020, issued in counterpart to JP Application No. 2016-036929, with English Translation. (12 pages).
Office Action dated Dec. 9, 2020, issued in counterpart DE application No. 112017001028.4 with English translation. (20 pages).

* cited by examiner

JOURNAL DEVICE AND ROTARY MACHINE

TECHNICAL FIELD

The present disclosure relates to a journal bearing and a rotary machine for supporting a rotor shall rotatably.

BACKGROUND ART

Generally, a journal bearing is known as a bearing device used in rotary machines such as steam turbines and gas turbines.

For instance, Patent Document 1 discloses a journal bearing supporting a rotor shaft with a plurality of bearing pads. Specifically, the journal bearing of Patent Document 1 includes a carrier ring, an upstream bearing pad and a downstream bearing pad supported by the carrier ring, and a plurality of oil-supply nozzles for supplying lubricant oil between each bearing pad and the rotor shaft. The plurality of oil-supply nozzles include a first oil-supply nozzle (most upstream nozzle) disposed upstream of the upstream bearing pad, second and third oil-supply nozzles disposed on both end portions of the upstream bearing pad, and a fourth oil-supply nozzle disposed on the upstream end portion of the downstream bearing pad. Furthermore, side plates are disposed on both end surfaces of the lower half section carrier ring, so as to suppress leakage of lubricant oil supplied from the oil-supply nozzles to the outside of the bearing.

Further, Patent Document 1 discloses a configuration including a pair of guide metals disposed separate from each other in the axial direction, on the radially inner side of the upper half section carrier ring in order to prevent backlash of the rotor shaft.

CITATION LIST

Patent Literature

Patent Document 1: JP4764486B

SUMMARY

Problems to be Solved

Meanwhile, in a journal bearing including a plurality of beating pads as described in Patent Document 1, during normal operation, an oil film of a suitable thickness is formed between the rotor shaft and each bearing pad as the rotation speed increases, and the pressure of the oil film causes the rotor shaft to levitate upward in a substantially vertical direction.

However, according to findings of the present inventors, failing to maintain a suitable balance in the load capacity between the plurality of bearing pads may lead to deterioration of the bearing performance and occurrence of abnormal vibration. For instance, if the oil-film pressure at the upstream bearing pad is insufficient and a sufficient load capacity cannot be ensured in the upstream region, the rotor shaft may become offset toward the upstream side during levitation which may cause abnormal vibration.

In view of the above, an object of at least one embodiment of the present invention is to provide a journal bearing and a rotary machine whereby it is possible to maintain a good balance of the load capacity between the plurality of bearing pads, thus preventing occurrence of abnormal vibration and improving the bearing performance.

Solution to the Problems (1) A journal bearing according to at least some embodiments of the present invention includes: a carrier ring; a plurality of bearing pads disposed on a radially inner side of a lower half region of the carrier ring, and configured to support a rotor shaft from below; and a guide metal disposed in an upper half region of the carrier ring, in center with respect to an axial direction of the rotor shaft, so as to cover an upper region of an outer peripheral surface of the rotor shaft.

(2) In some embodiments, in the above configuration (1), the journal bearing thither includes a pair of side plates disposed on both sides of the plurality of bearing pads with respect to the axial direction. A gap is provided between an inner peripheral surface of each of the side plates and the outer peripheral surface of the rotor shaft, for bringing into communication outside and a bearing interior space surrounded by the pair of side plates.

As a result of intensive research by the present inventors, it was found that a cause of shortage in the pressure of the oil film between the first bearing pad positioned most upstream and the rotor shaft may be air incorporated into the lubricant oil carried over to the first bearing pad.

That is, as in the above configuration (2), in a ease where the journal bearing includes a gap (side plate gap) between the inner peripheral surface of each side plate and the outer peripheral surface of the rotor shaft, for bringing into communication the outside and a bearing interior space surrounded by the pair of side plates, air sucked in from the gap may enter lubricant oil in a region from the second bearing pad on the downstream side to the first bearing pad. Thus, the lubricant oil carried over to the first bearing pad may contain a considerable amount of air and a substantially reduced amount of lubricant oil. Thus, even if the oil-supply units immediately upstream of the first beating pad and the oil-supply units immediately upstream of the second bearing pad discharge the same amount of oil, the lubricant oil is likely to become insufficient at the first bearing pad compared to the second bearing pad. Furthermore, while the lubricant oil is a non-compressive fluid, air contained in the lubricant oil is a compressive fluid. Thus, air bubbles contained in the lubricant oil are squashed at the first bearing pad on the upstream side (particularly, in the vicinity of the leading edge), which makes it less likely for a dynamic pressure to be generated at the leading edge side of the first bearing pad.

Accordingly, the load capacity of the first bearing pad decreases, which makes it difficult to maintain an appropriate balance of the load capacity between the plurality of bearing pads. Thus, the trajectory of the axial center of the rotor shaft deviates from the vertical line as the rotation speed increases, which may lead to occurrence of abnormal vibration and deterioration of the bearing performance.

As a result of further intensive research by the inventors, it was found that a semi-circular space held between a pair of guide metals disposed in the upper half region of the carrier ring gains a negative pressure as the rotor shaft rotates, taking in outside air through the minute gap between the guide metals and the outer peripheral surface of the rotor shaft, which may become a cause of incorporation of air into the carried-over oil. That is, carried-over oil containing air is produced by outside air flowing into the semi-circular space between the guide metals in the upper half region of the carrier ring, and being incorporated into oil that exists in the minute gap (oil adhering to the outer peripheral surface of the rotor shall or the inner peripheral surface of a guide metal).

Thus, in the above journal bearing (1), a guide metal is disposed in the center, with respect to the axial direction of the rotor shaft, so as to cover the upper region of the outer peripheral surface of the rotor shaft, in the upper half region of the carrier ring. Thus, unlike the case in which a pair of guide metals are provided, there is no negative-pressure space (semi-circular space between the pair of guide metals) that may cause incorporation of air into the carried-over oil, and thus it is possible to suppress generation of carried-over oil that contains a large volume of air.

Thus, even in a case where a side plate gap is provided to bring into communication the outside and the bearing interior space like the above configuration (2), it is possible to maintain an appropriate balance of the load capacity between the plurality of bearing pads, thus preventing occurrence of abnormal vibration in the journal bearing and improving the bearing performance.

(3) In some embodiments, in the above configuration (1) or (2), the journal bearing further includes a dam which is disposed on a downstream side of the guide metal and which has a greater width than the guide metal along, the axial direction.

With the above configuration (3), a dam having a greater width than the guide metal with respect to the rotor axial direction is disposed on the downstream side of the guide metal. Thus, the dam can effectively suppress a downstream flow of carried-over oil sent through the space on each side of the guide metal.

(4) In some embodiments, in the above configuration (3), the guide metal and the dam are formed integrally.

With the above configuration (4), the guide metal and the dam are formed integrally, and the guide metal and the dam are provided continuously. Thus, there is no space where the carried-over oil may incorporate air on the downstream side of the guide metal and the upstream side of the dam. Thus, it is possible to prevent occurrence of carried-over oil containing air effectively.

(5) In some embodiments, in the above configuration (3) or (4), provided that $W_{P1}$ is a width of a first bearing pad on a most upstream side of the plurality of bearing pads with respect to the axial direction, a width $W_{G\_TE}$ along the axial direction of a downstream end of the dam satisfies $W_{G\_TE} \geq 0.8 \times W_{P1}$.

With the above configuration (5), the width $W_{G\_TE}$ along the axial direction of the downstream end of the darn is not smaller than 0.8 times the width $W_{P1}$ of the first bearing pad on the most upstream side with respect to the axial direction. Thus, it is possible to reliably reduce carried-over oil that reaches the first bearing pad passing by both sides of the guide metal.

(6) In some embodiments, in any one of the above configurations (3) to (5), the dam includes a pair of flow guide portions which form both ends of the dam with respect to the axial direction, and which are configured to guide carried-over oil from an upstream side outward with respect to the axial direction.

With the above configuration (6), carried-over oil flowing along the rotational direction of the rotor shaft through the space on both sides of the guide metal is turned toward outside the bearing with the pair of flow guide portions, and thus it is possible to effectively suppress arrival of carried-over oil at the most upstream first bearing pad.

(7) In some embodiments, in the above configuration (6), a leading edge of each of the flow guide portions is inclined from a rotational direction of the rotor shaft outward with respect to the axial direction with distance toward a downstream side.

If a flow of carried-over oil turns rapidly at the flow guide portions, the carried-over oil may fail to be discharged smoothly outside the bearing.

In this regard, with the above configuration (7), the leading edges of the respective flow guide portions are inclined with respect to the rotational direction of the rotor shaft toward outside in the axial direction, with distance toward the downstream side, and thereby the carried-over oil is turned smoothly along the flow guide portions, and it is possible to discharge carried-over oil smoothly outside the bearing.

(8) In some embodiments, in any one of the above configurations (1) to (7), the guide metal includes at least one oil-supply port formed to have an opening on a surface of the guide metal which faces the rotor shaft, the guide metal being configured to supply lubricant oil to the surface of the guide metal.

With the above configuration (8), lubricant oil is supplied to the surface of the guide metal via the oil-supply port disposed on the surface facing the rotor shaft of the guide metal, and thus it is possible to maintain the lubrication property between the guide metal and the rotor shaft when the guide metal and the rotor shaft make contact.

Further, it can be considered that lubricant oil supplied from the oil-supply port to the minute gap between the guide metal and the outer peripheral surface of the rotor shaft flows downstream through the minute gap without making contact with air. Thus, lubricant oil from the oil-supply port has a lower risk of incorporation of air, unlike carried-over oil flowing downstream by both sides of the guide metal. Thus, as in the above configuration (8), by providing the oil-supply port on the surface of the guide metal and supplying lubricant oil from the oil-supply port, it is possible to supply lubricant oil with a low risk of incorporation of air to the most upstream pad positioned on the downstream side of the guide metal.

(9) In an embodiment, in the above configuration (8), the at least one oil-supply port is positioned on a most upstream portion of the guide metal or downstream of the most upstream portion.

In a typical journal bearing, upon rotation of the rotor shaft, the center axis of the rotor shaft is positioned below the center axis of the carrier ring. Thus, in the upper half region of the carrier ring, the gap between the guide metal and the outer peripheral surface of the rotor shaft widens gradually toward the downstream side from the upstream side with respect to the rotational direction of the rotor shaft, reaches its maximum at the uppermost portion H of the guide metal, and narrows gradually.

Thus, with the above configuration (9), the oil-supply port having an opening on the surface of the guide metal is disposed on the uppermost portion of the guide metal or on the downstream side of the uppermost portion. Accordingly, the oil-supply port is disposed in the region where the gap between the guide metal and the outer peripheral surface of the rotor shaft gradually narrows toward downstream with respect to the rotational direction of the rotor shaft, and thus it is possible to reduce the risk of incorporation of air into the carried-over oil from the oil-supply port even further.

(10) A rotary machine according to at least some embodiments of the present invention includes: the journal bearing according to any one of the above (1) to (9); and a rotor shaft supported by the journal bearing.

The above rotary machine (10) includes the journal bearing with a high bearing performance and a reduced risk of occurrence of abnormal vibration, and thus it is possible to provide a rotary machine with a high reliability.

Advantageous Effects

According to at least one embodiment of the present invention, since the guide metal is disposed in the center with respect to the axial direction of the rotor shaft, there is no negative pressure space (circular space between the pair of guide metals) that may cause incorporation of air into the carried-over oil, and thus it is possible to suppress generation of carried-over oil that contains a large volume of air.

Thus, even in a case where a side plate gap is provided to bring into communication the outside and the bearing interior space like the above embodiment, it is possible to maintain an appropriate balance of the load capacity between the plurality of bearing pads, thus preventing occurrence of abnormal vibration in the journal bearing and improving the bearing performance.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

First, with reference to FIGS. 1 to 3, the overall configuration of a journal bearing 10 according to some embodiments will be described.

Figure 1:
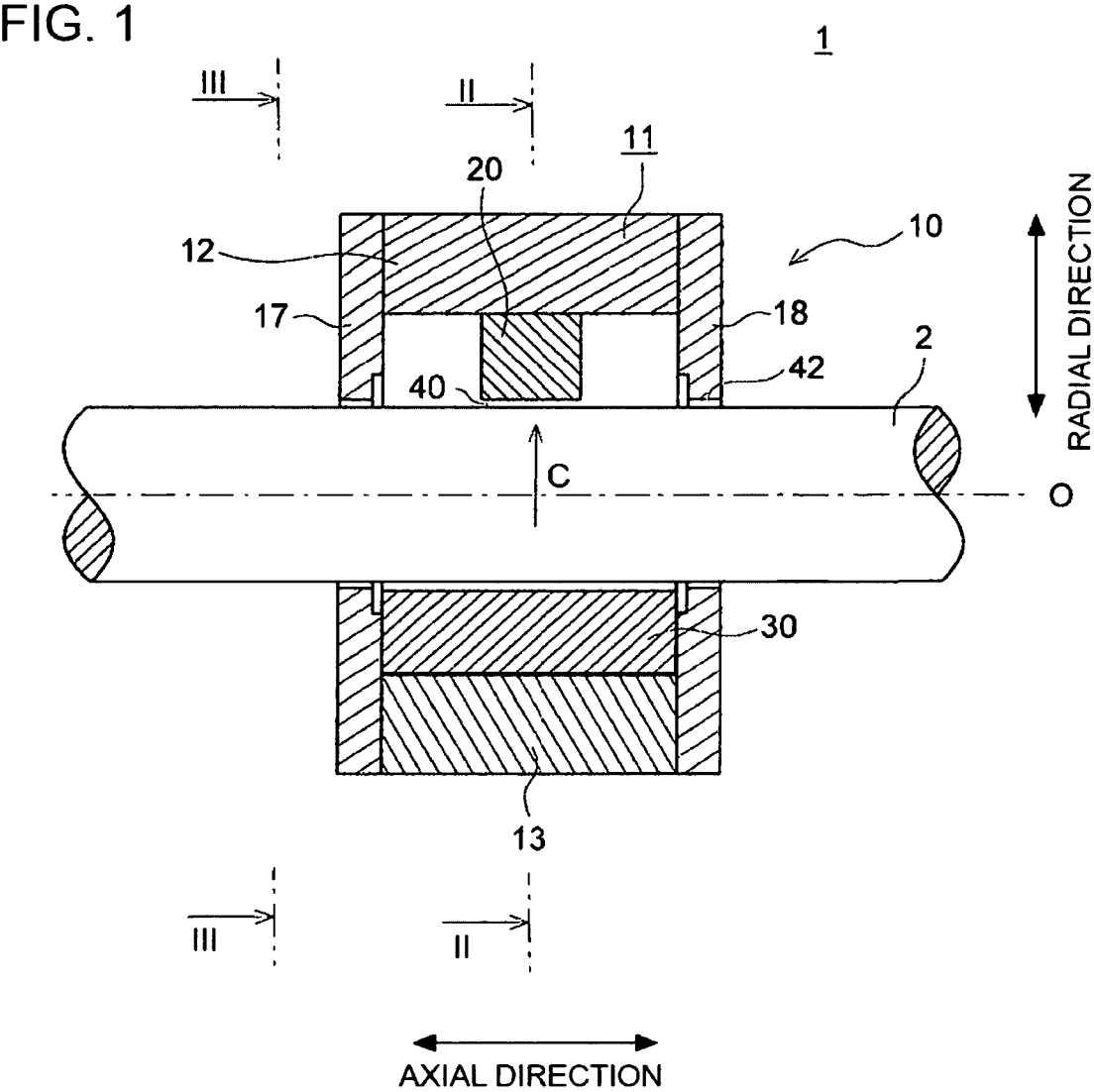
FIG. 1 is a cross-sectional view of a journal bearing according to an embodiment, taken along its axial direction.

FIG. 1 is a cross-sectional view of a journal bearing 10 according to an embodiment, taken along its axial direction. FIG. 2 is a cross-sectional view taken along line II-II in FIG. 1. FIG. 3 is an arrow view taken along line III-III in FIG. 1.

In the description of the present embodiment, "axial direction" refers to the direction of the center axis O of the rotor shall 2 supported by the journal bearing 10, and "radial direction" refers to the direction of the radius of the rotor shaft 2, and "circumferential direction" refers to the circumferential direction of the rotor shaft 2. The "circumferential direction" may be the circumferential direction of the carrier rings 12, 13, or the circumferential direction of the side plates 17, 18. Furthermore, in the present embodiment, "upstream side" or "downstream side" refers to the upstream side or the downstream side in the rotational direction of the rotor shaft 2.

Figure 2:
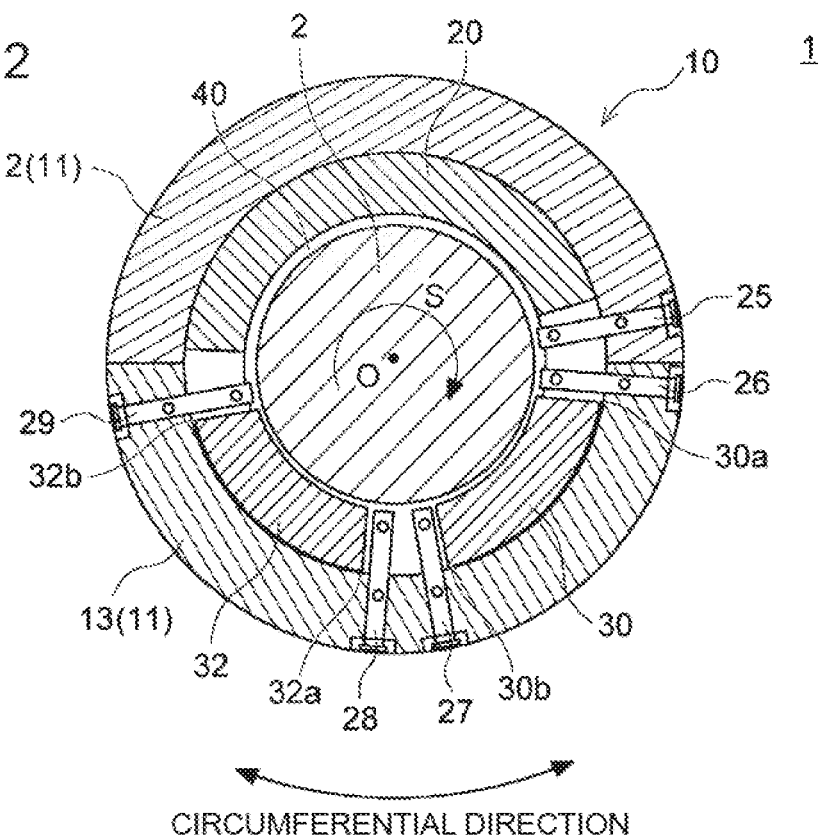
FIG. 2 is a cross-sectional view taken along line II-II in FIG. 1.
Figure 3:
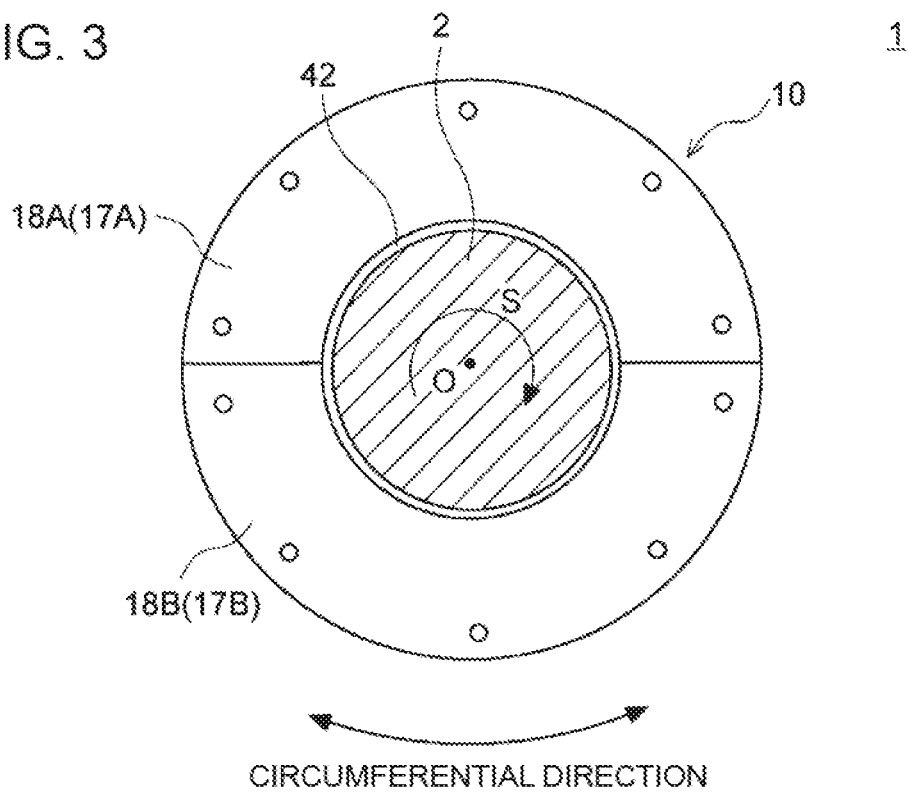
FIG. 3 is an arrow view taken along line III-III in FIG. 1.

In the embodiment shown in FIGS. 1 to 3, the journal bearing 10 uses the direct lubrication method, as a lubrication method (oil supply method), and includes a first bearing pad 30 and a second bearing pad 32 disposed in the lower half region of the carrier ring 11. For instance, the journal bearing 10 is a tilting-pad bearing. The leading edge 30a of the first bearing pad 30 is positioned on the upstream side, and the trailing edge 30b is positioned on the downstream side. Furthermore, the leading edge 32a of the second bearing pad 32 is positioned on the upstream side, and the trailing edge 32b is positioned on the downstream side.

Hereinafter, the journal bearing 10 shown in the drawings will be described as an example. Nevertheless, the journal bearing 10 according to the present embodiment is not limited to this configuration. For instance, in another embodiment, three or more bearing pads may be attached to the lower half region of the carrier ring 11.

In some embodiments, the journal bearing 10 includes a carrier ring 11, a plurality of bearing pads 30, 32 disposed in the radially inner side of the lower half region of the carrier ring 11 and configured to support the rotor shaft 2 from below and a pair of side plates 17, 18 disposed on both sides of the plurality of bearing pads 30, 32 with respect to the axial direction of the rotor shaft 2.

Hereinafter, the specific configuration example of each component in the journal bearing 10 will be described specifically.

The carrier ring 11 is supported by a bearing casing (not shown), and includes an upper half section carrier ring 12 and a lower half section carrier ring 13. The upper half section carrier ring 12 and the lower half section carrier ring 13 each include an inner peripheral surface and an outer peripheral surface having a semi-circular cross section in a direction perpendicular to the axial direction. In the example shown in the drawings, the carrier ring 11 is divided into the upper half section carrier ring 12 and the lower half section carrier ring 13. Nevertheless, the carrier ring 11 may have an integrated structure, or may be divided into three pieces or more. Furthermore, also in a case where the carrier ring 11 has another configuration (not shown), a region above a horizontal plane passing through the center axis O is referred to as an upper region, and a region below the horizontal plane is referred to as a lower region.

On both end sides of the carrier ring 11 with respect to the axial direction, a pair of side plates 17, 18 are disposed along the outer periphery of the rotor shaft 2. The side plates 17, 18 are forayed to have a disc shape, and have a hole formed in the center, through which the rotor shaft 2 is inserted. As shown in FIG. 3, the side plates 17, 18 may have a halved structure including upper half section side plates 17A, 18A and lower half section side plates 17B, 18B.

These side plates 17, 18 suppress outward leakage of lubricant oil supplied from the oil-supply units 25 to 29 described below, to a suitable extent.

The upper half section carrier ring 12 and the lower half section carrier ring 13 include at least one oil-supply units 25 to 29. For instance, the oil-supply units 25 to 29 are oil-supply nozzles.

In the example shown in FIG. 2, in a case where the rotor shaft 2 rotates clockwise as indicated by the arrow S in the drawing, five oil-supply units are disposed from the upstream side with respect to the rotational direction S of the rotor shaft 2, including: the first oil-supply unit 25, the second oil-supply unit 26, the third oil-supply unit 27, the fourth oil-supply unit 28, and the fifth oil-supply unit 29.

Figure 4:
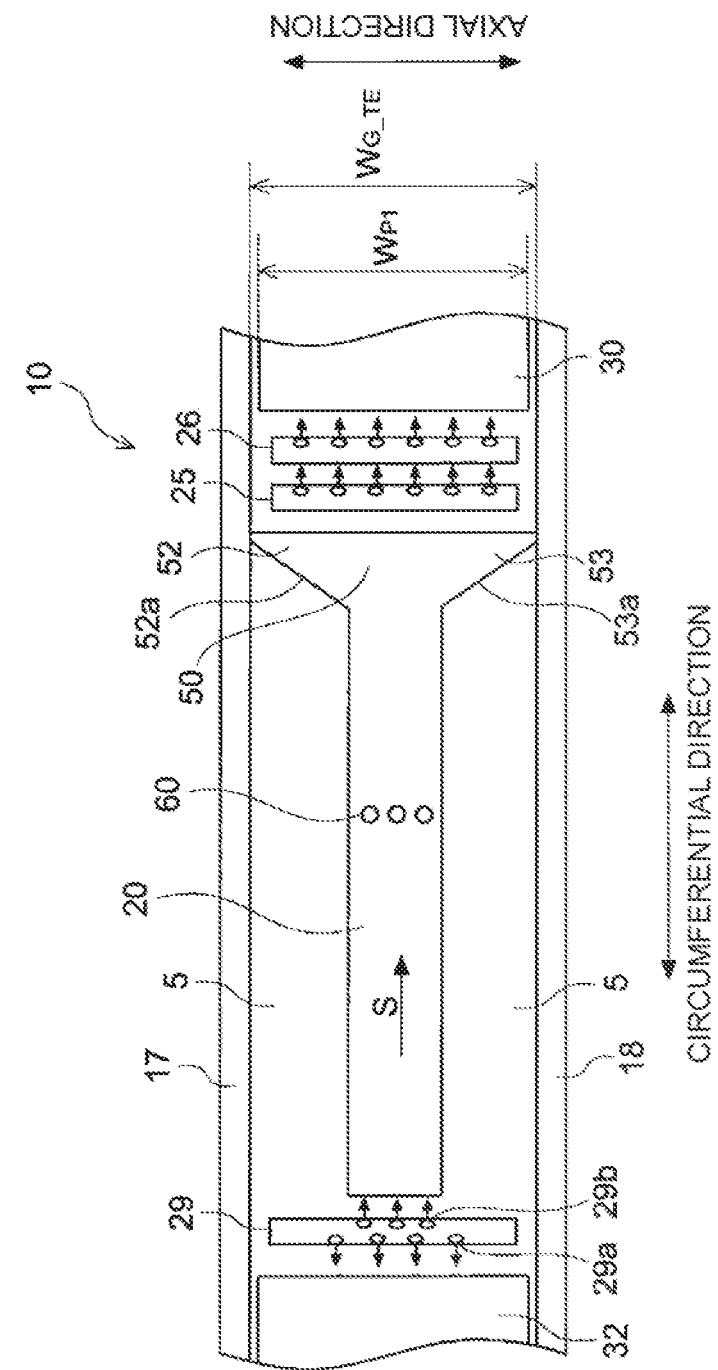
FIG. 4 is an exploded view of an upper half region of a journal bearing according to an embodiment (exploded view of the journal bearing shown in FIG. 1 seen in the direction C).

Specifically, the first oil-supply unit 25 and the second oil-supply unit 26 are disposed aligned in the circumferential direction, on the upstream side of the first bearing pad 30 positioned most upstream. The third oil-supply unit 27 and the fourth oil-supply unit 28 are disposed aligned in the circumferential direction, between the first bearing pad 30 and the second bearing pad 32 disposed on the downstream side of the first bearing pad 30. The fifth oil-supply unit 29 is disposed downstream of the second bearing pad 32. As shown in FIG. 4, the fifth oil-supply unit 29 may include a first injection nozzle 29a and a second injection nozzle 29b configured to inject lubricant oil in different directions. In this case, the first injection nozzle 29a may be configured to inject lubricant oil to the upstream side toward the second bearing pad 32, in order to cool the second bearing pad (most downstream pad) 32. Furthermore, the second injection nozzle 29b is configured to inject lubricant oil downstream toward the guide metal 20, in order to maintain the lubrication property when the guide metal 20 and the rotor shaft 2 make contact.

Referring to FIGS. 1 to 3 again, a lubricant oil supply passage (not shown) is disposed through the carrier ring 11. Lubricant oil supplied to the lubricant oil supply passage is sent to each of the oil-supply units 25 to 29, and is injected from each of the oil-supply units 25 to 29 to the vicinity of the bearing pads 30, 32.

The first bearing pad 30 and the second bearing pad 32 are disposed on the radially inner side of the lower half section carrier ring 13, and are configured to support the rotor shaft 2 from below.

The first bearing pad 30 is disposed along the outer periphery of the rotor shaft 2, on the radially inner side of the lower half section carrier ring 13.

The second bearing pad 32 is disposed along the outer periphery of the rotor shaft 2, on the radially inner side of the lower half section carrier ring 13, downstream of the first bearing pad 30 with respect to the rotational direction S of the rotor shaft 2.

Accordingly the first bearing pad 30 and the second bearing pad 32 are disposed in the lower half section carrier ring 13, and thus it is possible to support the rotor shaft 2 appropriately with the first bearing pad 30 and the second bearing pad 32.

In a case where the carrier ring 11 has an integrated structure instead of a structure divided into the upper half section carrier ring 12 and the lower half section carrier ring 13, or has a structure divided into three pieces or more, it is sufficient if the first bearing pad 30 and the second bearing pad 32 are disposed in the lower half region of the carrier ring 11.

Figure 5:
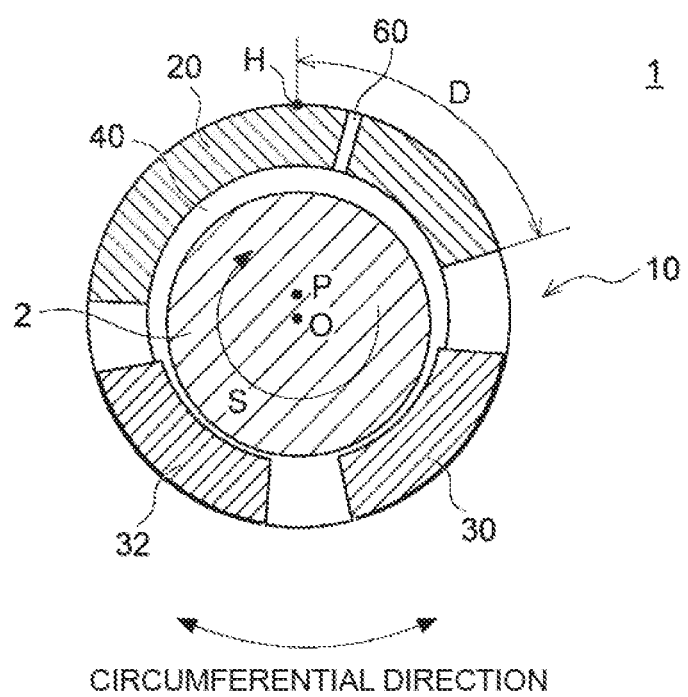
FIG. 5 is a cross-sectional view of a guide metal and an oil-supply port according to an embodiment.

Next, with reference to FIGS. 1, 2, 4 and 5, the specific configuration of the guide metal 20 and its peripheral structure will be described. FIG. 4 is an exploded view of an upper half region of a journal bearing 10 according to an embodiment (exploded view of the journal bearing 10 shown in FIG. 1 seen in the direction C). FIG. 5 is a cross-sectional view of a guide metal 20 and an oil-supply port 60 according to an embodiment.

As shown in FIGS. 1, 2, and 4, in some embodiments, the journal bearing 10 includes a guide metal (semi-circular bearing portion) 20 disposed on the center part with respect to the axial direction of the rotor shaft 2, so as to cover an upper region of the outer peripheral surface of the rotor shaft 2 in the upper half region of the carrier ring 11 (in the example shown in the drawings, the upper half section carrier ring 12).

For instance, the journal bearing 10 includes one guide metal 20 extending in the circumferential direction, disposed in the center with respect to the axial direction of the rotor shaft 2. The width of the guide metal 20 (length in the axial direction of the rotor shaft 2) is not particularly limited, and it is sufficient if it is possible to support the load in case of backlash of the rotor shaft 2. The guide metal 20 may be formed to have a semi-circular shape, as shown in FIG. 2. It is possible to restrict backlash of the rotor shaft 2 with the guide metal 20, and to prevent breakage or the like of a component due to backlash of the rotor shaft 2.

Further, as described above, in a case where the journal bearing 10 includes a pair of side plates 17, 18 disposed on both sides of the plurality of bearing pads 30, 32 with respect to the axial direction, a gap (side plate gap) 42 is provided between the inner peripheral surfaces of the respective side plates 17, 18 and the outer peripheral surface of the rotor shaft 2, for bringing, into communication the outside and a bearing interior space surrounded by the pair of side plates 17, 18.

As a result of intensive research by the present inventors, it was found that a cause of shortage in the pressure of the oil film between the first bearing pad 30 positioned most upstream and the rotor shaft 2 may be air incorporated into the lubricant oil carried over to the first bearing pad 30.

That is, in a case where the journal bearing 10 includes a side plate gap 42 (see FIGS. 1 and 3) between the inner peripheral surfaces of the respective side plates 17, 18 and the outer peripheral surface of the rotor shaft 2, for bringing into communication the outside and a bearing interior space surrounded by the pair of side plates 17, 18, air sucked in from the gap 42 may enter lubricant oil in a region from the second bearing pad 32 on the downstream side to the first bearing pad 30. Thus, the lubricant oil carried over to the first bearing pad 30 may contain a considerable amount of air and a substantially reduced amount of lubricant oil. Thus, even if the oil-supply units 25, 26 immediately upstream of the first bearing pad 30 and the oil-supply units 27, 28 immediately upstream of the second bearing pad 32 discharge the same amount of oil, the lubricant oil is likely to become insufficient at the first bearing pad 30 compared to the second bearing pad 32. Furthermore, while the lubricant oil is a non-compressive fluid, air contained in the lubricant oil is a compressive fluid. Thus, air bubbles contained in the lubricant oil are squashed at the first bearing pad 30 on the upstream side (particularly, in the vicinity of the leading edge), which makes it less likely for a dynamic pressure to be generated near the leading edge 30a of the first bearing pad 30.

Accordingly, the load capacity of the first bearing pad 30 decreases, which makes it difficult to maintain an appropriate balance of the load capacity between the plurality of bearing pads 30, 32. Thus, the trajectory of the axial center of the rotor shaft 2 deviates from the vertical line as the rotation speed increases, which may lead to occurrence of abnormal vibration and deterioration of the bearing performance.

As a result of further intensive research by the inventors, it was found that, in a configuration in which a pair of guide metals are disposed in the upper half region of the carrier ring, a semi-circular space held between the pair of guide metals gains a negative pressure as the rotor shaft rotates, taking in outside air through the minute gap between the guide metals and the outer peripheral surface of the rotor shaft, which may become a cause of incorporation of air into the carried-over oil. That is, carried-over oil containing air is produced by outside air flowing into the semi-circular space between the pair of guide metals in the upper half region of the carrier ring, and being incorporated with oil that exists in the minute gap (adhering to the outer peripheral surface of the rotor shaft or the inner peripheral surface of a guide metal).

Thus, in the journal bearing 10 according to the above embodiment, a guide metal is disposed in the center, with respect to the axial direction of the rotor shaft 2, so as to cover the upper region of the outer peripheral surface of the rotor shaft 2, in the upper half region of the carrier ring 11. Thus, unlike the case in which a pair of guide metals are provided, there is no negative-pressure space (semi-circular space between the pair of guide metals) that may cause incorporation of air into the carried-over oil, and thus it is possible to suppress generation of carried-over oil that contains a large volume of air.

Thus, even in a case where a side plate gap 42 is provided to bring into communication the outside and the bearing interior space like the above embodiment, it is possible to maintain an appropriate balance of the load capacity between the plurality of bearing pads 30, 32, thus preventing occurrence of abnormal vibration in the journal bearing 10 and improving the bearing performance.

In some embodiments, as shown in FIG. 4, the journal bearing 10 further includes a dam 50 disposed on the downstream side of the guide metal 20, having a width greater than that of the guide metal 20 in the axial direction.

According to the above embodiment, the dam 50 can effectively suppress a downstream flow of carried-over oil sent through the space on each side of the guide metal 20.

In an embodiment, the guide metal 20 and the dam 50 are formed integrally.

According to this embodiment, the guide metal 20 and the dam 50 are formed integrally, and the guide metal 20 and the dam 50 are provided continuously. Thus, there is no space where incorporation of air into the carried-over oil may occur, on the downstream side of the guide metal 20 and the upstream side of the dam 50. Thus, it is possible to prevent occurrence of carried-over oil containing air effectively.

In another embodiment, although not illustrated, the guide metal 20 and the dam 50 may be formed separately.

In some embodiments, the width $W_{G\_TE}$ of the downstream end of the dam 50 with respect to the axial direction satisfies $W_{G\_TE} \geq 0.8 \times W_{P1}$, provided that $W_{P1}$ is the width of the first bearing pad 30, with respect to the axial direction, on the most upstream side of the plurality of bearing pads 30, 32.

According to the above embodiment, the width $W_{G\_TE}$ along the axial direction of the downstream end of the dam 50 is not smaller than 0.8 times the width $W_{P1}$ of the first bearing pad 30 on the most upstream side with respect to the axial direction. Thus, it is possible to reliably reduce carried-over oil that reaches the first bearing pad 30 through the space 5 on both sides of the guide metal 20.

In some embodiments, the dam 50 forms both ends of the dam 50 in die axial direction, and has a pair of flow guide portions 52, 53 configured to guide carried-over oil from the upstream side outward in the axial direction.

In the above embodiment, carried-over oil flowing along the rotational direction of the rotor shaft 2 through the space 5 on both sides of the guide metal 20 is turned toward outside the bearing with the pair of flow guide portions 52, 53, and thus it is possible to effectively suppress arrival of carried-over oil at the most upstream first bearing pad 30.

In an embodiment, the leading edges 52a, 53a of the respective flow guide portions 52, 53 are inclined with respect to the rotational direction of the rotor shaft 2 toward outside in the axial direction, with distance toward the downstream side. That is, the leading edges 52a, 53a of the respective flow guide portions 52, 53 are inclined so that the center part with respect to the axial direction is positioned on the upstream side, and both end sides with respect to the axial direction are positioned on the downstream side. Further, the "leading edges" 52a, 53a refer to edge portions positioned upstream with respect to the rotational direction of the rotor shaft 2.

If a flow of carried-over oil turns rapidly at the flow guide portions 52, 53, the carried-over oil may fail to be discharged smoothly outside the bearing.

In this regard, with the above configuration, the leading edges 52a, 53a of the respective flow guide portions 52, 53 are inclined with respect to the rotational direction of the rotor shaft 2 toward outside in the axial direction, with distance toward the downstream side, and thereby the carried-over oil is turned smoothly along the flow guide portions 52, 53, and it is possible to discharge carried-over oil smoothly outside the bearing.

The guide metal 20 is provided in order to prevent backlash of the rotor shaft 2 as described above, and thus normally disposed such that the inner peripheral surface of the guide metal 20 is positioned closer to the rotor shaft 2 than the inner peripheral surfaces of the side plates 17, 18. That is, the gap 42 (see FIGS. 1 and 3) between the inner peripheral surfaces of the side plates 17, 18 and the inner peripheral surface of the rotor shaft 2 is greater than the gap 40 (sees FIGS. 1 and 2) between the inner peripheral surface of the guide metal 20 and the outer peripheral surface of the rotor shaft 2. Thus, without providing a discharge passage for lubricant oil on the side plates 17, 18, the lubricant oil guided toward the side plates 17, 18 along the flow guide portions 52, 53 can be discharged outside the bearing through the gap 42 (see FIG. 1) between the inner peripheral surfaces of the side plates 17, 18 and the outer peripheral surface of the rotor shaft 2. Nevertheless, it will be naturally understood that discharge passages corresponding to the flow guide portions 52, 53 may be formed through the side plates 17, 18.

In some embodiments shown in FIGS. 4 and 5, the guide metal 20 has at least one oil-supply port 60 having an opening on the surface of the guide metal 20 that faces the rotor shall 2, and configured to supply lubricant oil to the surface of the guide metal 20.

In FIG. 4, a plurality of oil-supply ports 60 are disposed in the axial direction. Further, in a case where the fifth oil-supply unit 29 includes the second injection nozzle 29b, the second injection nozzle 29b may be disposed in the center region, with respect to the axial direction, corresponding to the position of the guide metal 20. It is possible to ensure the lubrication property of the guide metal 20 on the upstream side of the oil-supply port 60, with the lubricant oil supplied from the second injection nozzle 29b.

According to the above embodiment, lubricant oil is supplied to the surface of the guide metal 20 via the oil-supply port 60 disposed on the surface facing the rotor shaft 2 of the guide metal 20, and thus it is possible to maintain the lubrication property between the guide metal 20 and the rotor shaft 2 when the guide metal 20 and the rotor shaft 2 make contact.

Further, it can be considered that lubricant oil supplied from the oil-supply port 60 to the minute gap 40 (see FIGS. 1 and 2) between the guide metal 20 and the outer peripheral surface of the rotor shaft 2 flows downstream through the minute gap 40 without making contact with air. Thus, lubricant oil from the oil-supply port 60 has a lower risk of incorporation of air into the carried-over oil, unlike carried-over oil flowing downstream by both sides of the guide metal 20. Thus, as in the above embodiment, by providing the oil-supply port 60 on the surface of the guide metal 20 and supplying lubricant oil from the oil-supply port 60, it is possible to supply lubricant oil with a low risk of incorporation of air to the first bearing pad 30 positioned on the downstream side of the guide metal 20.

As shown in FIG. 5, the at least one oil-supply port 60 may be positioned on the uppermost portion H of the guide metal 20, or in the region D on the downstream side of the uppermost portion H.

In a typical journal bearing 10, upon rotation of the rotor shaft 2, the center axis O of the rotor shaft 2 is positioned below the center axis P of the carrier ring. Thus, in the upper half region of the carrier ring 11, the gap 40 between the guide metal 20 and the outer peripheral surface of the rotor shaft 2 widens gradually toward the downstream side from the upstream side with respect to the rotational direction of the rotor shaft 2, reaches its maximum at the uppermost portion H of the guide metal 20, and narrows gradually.

Thus, with the above configuration, the oil-supply port 60 having an opening on the surface of the guide metal 20 is disposed on the uppermost portion H of the guide metal 20 or on the downstream side of the uppermost portion H. Accordingly, the oil-supply port 60 is disposed in the region D where the gap 40 between the guide metal 20 and the outer peripheral surface of the rotor shaft 2 gradually narrows toward downstream with respect to the rotational direction of the rotor shaft 2, and thereby it is possible to reduce the risk of incorporation of air into the carried-over oil from the oil-supply port 60 even further As described above, according to at least some embodiments of the present invention, since the guide metal 20 is disposed in the center with respect to the axial direction of the rotor shaft 2, there is no negative pressure space circular space between the pair of guide metals) that may cause incorporation of air into the carried-over oil, and thus it is possible to suppress generation of carried-over oil that contains a large volume of air.

Thus, even in a case where a side plate gap 42 is provided to bring into communication the outside and the bearing interior space like the above embodiment, it is possible to maintain an appropriate balance of the load capacity between the plurality of bearing pads 30, 32, thus preventing occurrence of abnormal vibration, in the journal bearing 10 and improving the bearing performance.

Furthermore, as shown in FIG. 1, the journal bearing 10 of the present embodiment may be applied to rotary machines including turbines such as gas turbines, steam turbines (steam turbines of nuclear power plants), and turbines for driving a machine, wind power machines such as wind turbine generators, blowers, turbochargers, and compressors, for instance.

The rotary machine 1 includes the rotor shaft 2 to be rotary driven, a bearing housing (not shown) accommodating the rotor shaft 2, and the journal bearing 10 for supporting the rotor shaft 2.

This rotary machine 1 includes the journal bearing 10 with a high bearing performance and a reduced risk of occurrence of abnormal vibration, and thus it is possible to provide a rotary machine 1 with a high reliability.

Embodiments of the present invention were described in detail above, but the present invention is not limited thereto, and various amendments and modifications may be implemented.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

1 Rotary machine
2 Rotor shaft
5 Space
10 Journal bearing
11 Carrier ring
12 Upper half section carrier ring
13 Lower half section carrier ring
17, 18 Side plate
20 Guide metal
25 First oil-supply unit
26 Second oil-supply unit
27 Third oil-supply unit
28 Fourth oil-supply unit
29 Fifth oil-supply unit
29a First injection nozzle
29b Second injection nozzle
30 First bearing pad
32 Second bearing pad
50 Dam
52, 53 Flow guide portion
52a, 53a Leading edge
60 Oil-supply port

The invention claimed is:

1. A journal bearing, comprising:
an upper and lower pair of carrier rings;
a plurality of bearing pads disposed on a radially inner side of a lower half region of the upper and lower pair of carrier rings, configured to support a rotor shaft from below, and lubricant oil is supplied between an outer peripheral surface of the rotor shaft and the plurality of bearing pads;
a pair of side plates disposed on both sides of the plurality of bearing pads with respect to an axial direction of the rotor shaft; and,
a single guide metal disposed in center with respect to the axial direction of the rotor shaft in a semi-circular space formed by an upper half region of the carrier ring and the pair of side plates, restricting backlash of the rotor shaft by contact with the rotor shaft, and extending in the circumferential direction of the carrier ring in the upper half region of the carrier ring,
wherein a first gap is provided between an inner peripheral surface of each of the side plates and the outer peripheral surface of the rotor shaft, for bringing into communication outside and the semi-circular space, and
wherein the first gap is greater than a second gap provided between an inner peripheral surface of the guide metal and the outer peripheral surface of the rotor shaft.

2. The journal bearing according to claim 1,
further comprising a dam which is disposed on a downstream side of the guide metal and which has a greater width than the guide metal along the axial direction.

3. The journal bearing according to claim 2,
wherein the guide metal and the dam are formed integrally.

4. The journal bearing according to claim 2,
wherein, provided that $W_{P1}$ is a width of a first bearing pad on a most upstream side of the plurality of bearing pads with respect to the axial direction, a width $W_{G\_TE}$ along the axial direction of a downstream end of the dam satisfies $W_{G\_TE} \geq 0.8 \times W_{P1}$.

5. The journal bearing according to claim 2,
wherein the dam includes a pair of flow guide portions which form both ends of the dam with respect to the axial direction, and which are configured to guide carried-over oil from an upstream side outward with respect to the axial direction.

6. The journal bearing according to claim 5,
wherein a leading edge of each of the flow guide portions is inclined from a rotational direction of the rotor shaft outward with respect to the axial direction with distance toward a downstream side.

7. The journal bearing according to claim 1,
wherein the guide metal includes at least one oil-supply port formed to have an opening on a surface of the guide metal which faces the rotor shaft, the guide metal being configured to supply lubricant oil to the surface of the guide metal.

8. A rotary machine, comprising:
the journal bearing according to claim 1; and
a rotor shaft supported by the journal bearing.

9. A journal bearing, comprising:
a carrier ring;
a plurality of bearing pads disposed on a radially inner side of a lower half region of the carrier ring, and configured to support a rotor shaft from below;
a guide metal disposed in an upper half region of the carrier ring, in center with respect to an axial direction of the rotor shaft, so as to cover an upper region of an outer peripheral surface of the rotor shaft; and
a dam which is disposed on a downstream side of the guide metal and which has a greater width than the guide metal along the axial direction,
wherein the guide metal and the dam are formed integrally.

10. A journal bearing, comprising:
an upper and lower pair of carrier rings;
a plurality of bearing pads disposed on a radially inner side of a lower half region of the upper and lower pair of carrier rings, configured to support a rotor shaft from below, and lubricant oil is supplied between an outer peripheral surface of the rotor shaft and the plurality of bearing pads;
a pair of side plates disposed on both sides of the plurality of bearing pads with respect to an axial direction of the rotor shaft; and
a single guide metal disposed in center with respect to the axial direction of the rotor shaft, in a semi-circular space formed by an upper half region of the carrier ring and the pair of side plates, restricting backlash of the rotor shaft by contact with the rotor shaft, and extending in the circumferential direction of the carrier ring in the upper half region of the carrier ring,
wherein the guide metal includes at least one oil-supply port formed to have an opening on a surface of the guide metal which faces the rotor shaft, the guide metal being configured to supply lubricant oil to the surface of the guide metal, and
wherein the at least one oil-supply port is positioned on a most upstream portion of the guide metal or downstream of the most upstream portion.

* * * * *